UNITED STATES PATENT OFFICE.

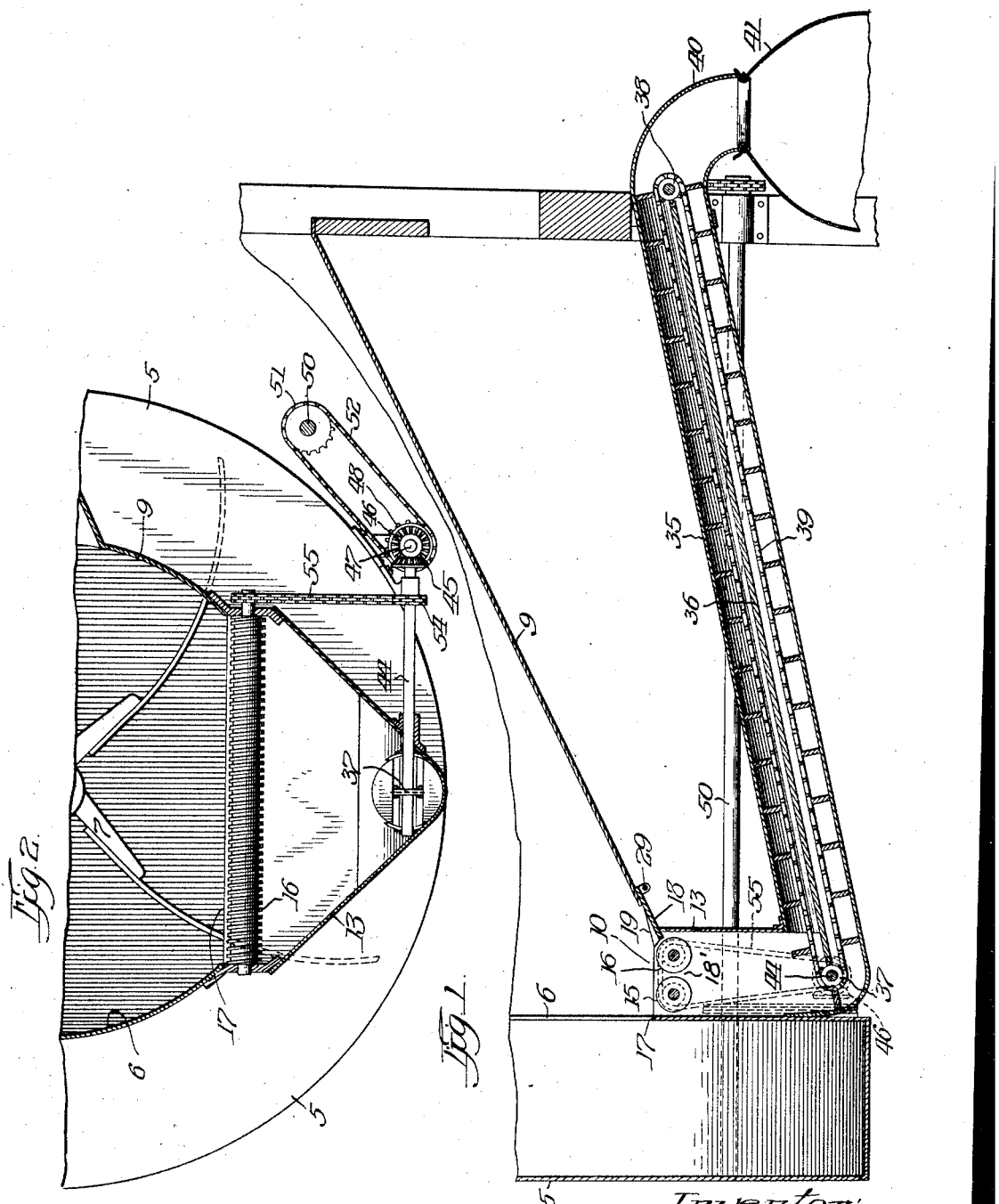

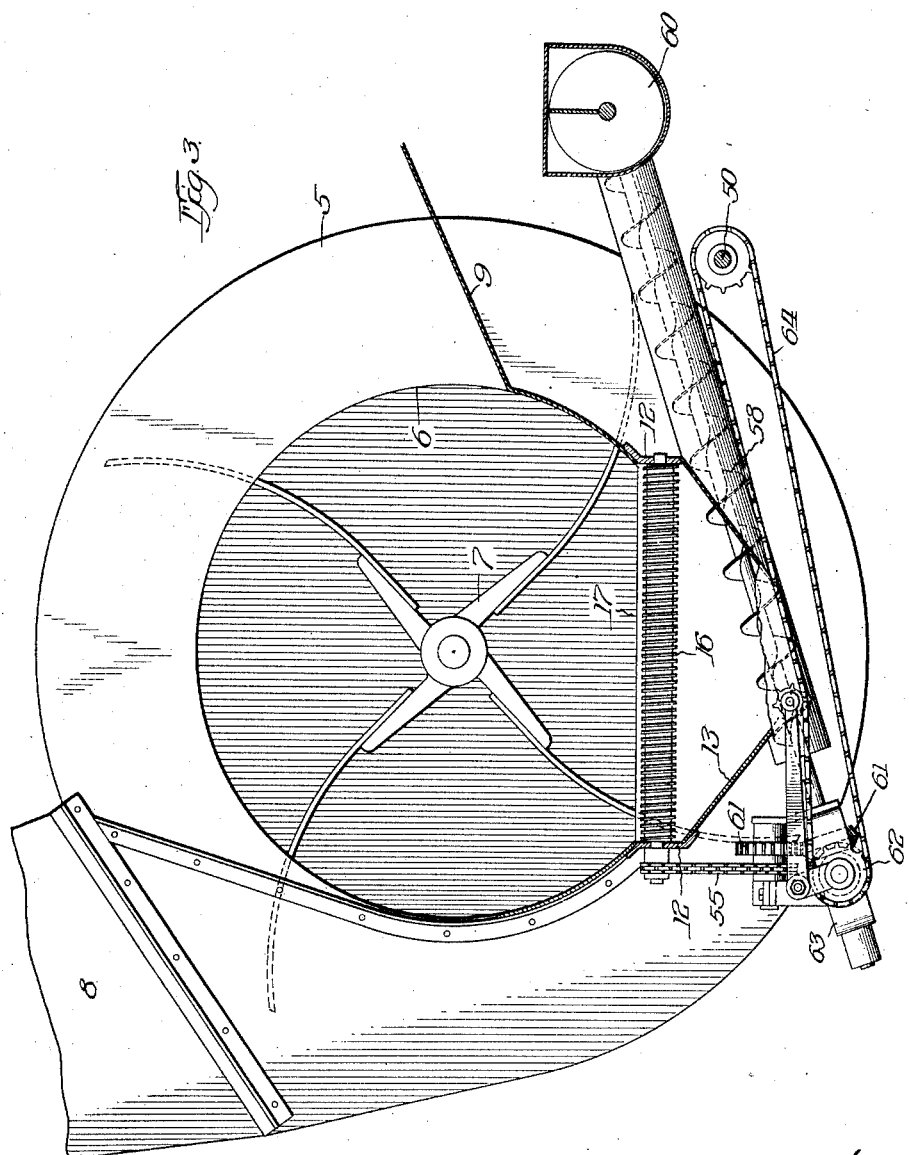

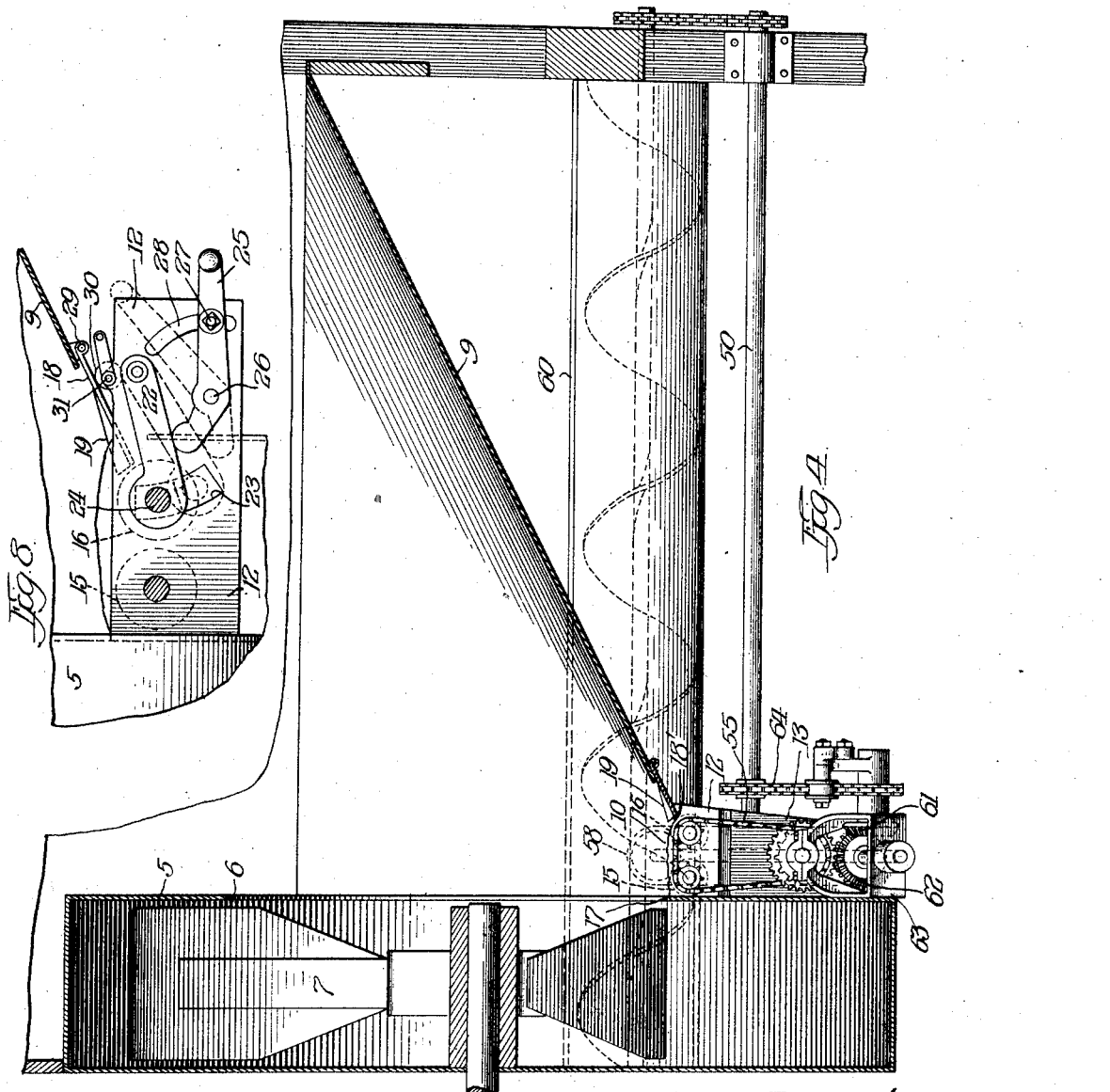

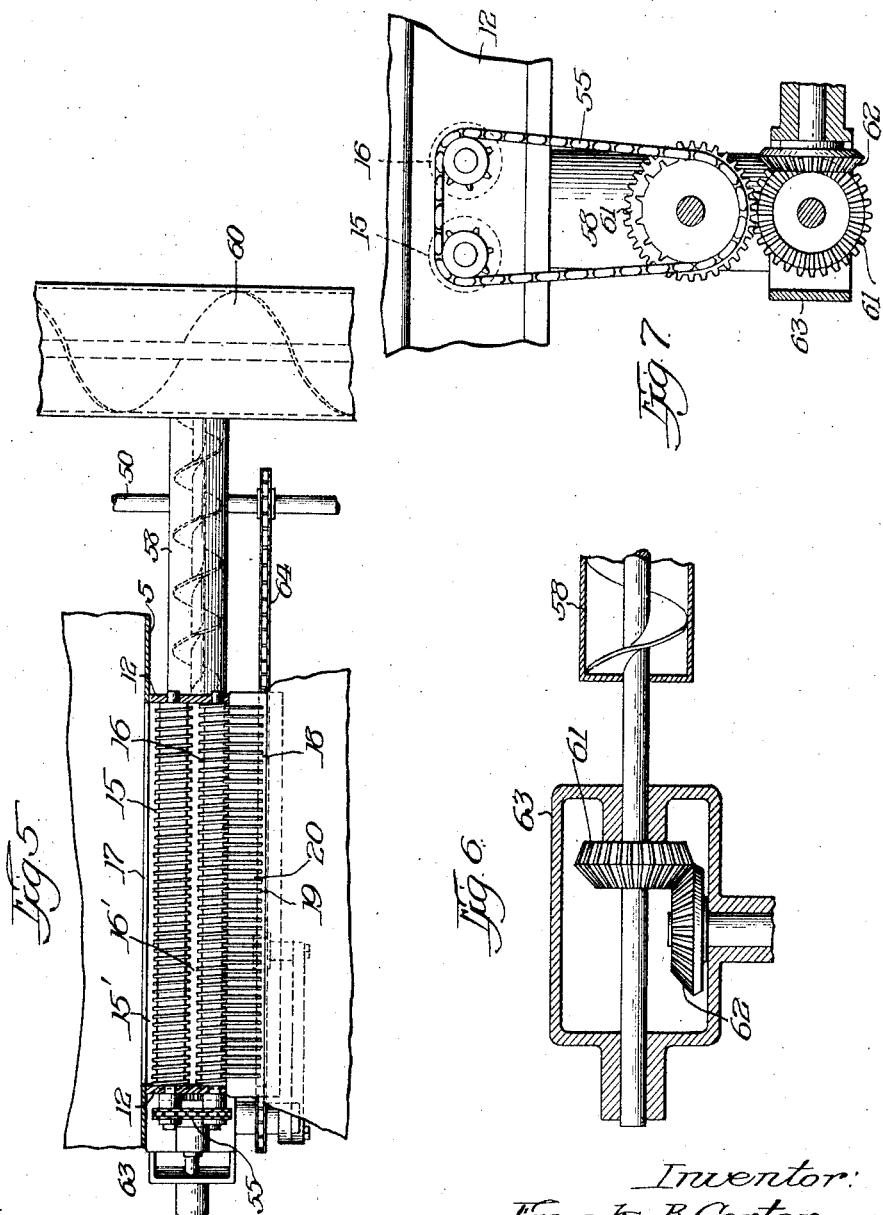

FRANK B. CARTER, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

PNEUMATIC STRAW STACKER.

1,415,792.　　　Specification of Letters Patent.　　Patented May 9, 1922.

Application filed January 26, 1921. Serial No. 439,926.

*To all whom it may concern:*

Be it known that I, FRANK B. CARTER, a citizen of the United States, residing at Indianapolis, in the county of Marion and State of Indiana, have invented certain new and useful Improvements in Pneumatic Straw Stackers, of which the following is a specification.

My present invention relates to pneumatic stackers for threshing machines and the like, and particularly to that type known as grain saving wind stackers of which Letters Patent No. 1,273,255, dated July 23, 1918, discloses a practical example, and which type is designed to trap and save the grain mingled with straw and other material discharged from the rear end of a threshing machine, thus preventing waste of such grain in the straw stack. In said patent it will be observed that the grain trap comprises in part a series of stationary bars spaced apart so that the grain winnowed by the auxiliary blast pipe will become trapped in the channels between the bars and conveyed back to the tailings auger of the threshing machine by any suitable device, such as the auger indicated.

In the operation of the type of stacker referred to it occasionally occurs that when the straw is heavily charged with chaff because of crop conditions or irregularities in the speed of the separating elements of the thresher, the grain trap becomes overloaded with chaff and debris, which consequently has a choking effect upon the trap and the conveyer which returns such material to the tailings auger of the thresher, and at times unduly burdens said tailings auger and the carrier which communicates therewith. It is my object to overcome this irregularity, which I accomplish in a simple and effective manner by the means hereinafter to be explained, and by which I increase the efficiency of a grain saving wind stacker and materially reduce its cost of production.

In the accompanying drawings, forming part hereof, Figure 1 is a sectional view indicating my improved grain trap and a carrier communicating therewith which leads to the opposite wall of the thresher, said view being taken as seen when looking toward the rear end of the stacker; Fig. 2, a sectional view of my improved trap and associated mechanisms as seen when looking toward the stacker fan; Fig. 3, a side elevation, partially in section, of the stacker fan, trap, return auger, and associated operating mechanisms; Fig. 4, a rear elevation of the construction shown in Fig. 3; Fig. 5, a plan of the grain trap; Fig. 6, a detail sectional view of the driving mechanism for the return auger shown in Fig. 5; Fig. 7, an end view showing the manner of driving the grain trap elements from the return auger, and Fig. 8 is a detail view of the mechanisms for adjusting a roller and the comb forming part of my improvements.

In the present type of grain saving wind stacker it is the practice to employ a blast for winnowing and moving material across the trap, which blast is provided by attaching a pipe to an enlarged portion of the fan drum, leading the same around to the trap and providing a distributing nozzle upon its end, the fan drum necessitating special construction as indicated in Fig. 6 of Patent No. 1,014,778, dated January 16, 1912, and the installation of a screen therein as indicated in Patent No. 1,028,793, dated June 4, 1912. Such construction of drum and the additional screen and auxiliary blast pipe referred to add materially to the cost of producing a stacker, and its maintenance by renewal of parts, and, further, such assemblage increases the complexity of the machine. By my improvements I am enabled to eliminate such elements and utilize a plain stacker drum with a circular or other form of eye or inlet without decreasing efficiency, and at the same time greatly reduce the cost of production of a grain saving wind stacker.

In the drawings, 5, indicates the fan drum having a circularly formed inlet, 6, in which a fan, 7, is mounted in any well known manner, said drum having a discharge outlet, 8, as usual. Communicating with said fan casing is the usual material receiving and conveying hopper, 9, which in preferred form, as indicated in Fig. 1, is of an inclined or sloping character, but may be of any selected formation, said hopper being cut away or having an opening therein, at 10, within which space the ordinary or my improved grain trap may be located. In my improved construction I may include brackets or walls, 12, secured to the fan drum 5, which may terminate in or support a hopper, as 13, for directing material downwardly, said walls being adapted also to support my improved grain trap. As indicated in Fig. 5, said trap comprises two or more grooved or convoluted rollers, 15, 16, the former being mounted in said walls or support 12 adjacent the lower edge, 17, of the fan inlet, while roller 16 is mounted in said support and arranged to lie parallel with roller 15 (Fig. 5). Also mounted upon said support 12 is a grooved plate or comb, 18, comprising a series of ridges, 19, the spaces therebetween constituting channels, 20, for a purpose to be described, and which plate is preferably adjustably mounted. The roller 16 may be mounted upon swinging bearings, as 22, indicated in Fig. 8, or otherwise, so that it may be adjusted in various positions in relation to roller 15 to lessen or increase the distance between said rollers. In such an arrangement I provide slots, 23, in said supporting means 12 to permit the roller bearing or shaft, 24, to travel in the desired direction, said bearings 22 being actuated in any suitable manner, as by the rocker arms, 25, pivotally mounted, at 26, in said support 12, said rocker arms being held in fixed position by fastening devices, as 27, which pass through slots, 28, in support 12. Comb 18 may also be pivotally mounted upon hopper 9, as at 29, so that its lower end may be adjusted vertically by any suitable mechanism, as by a cam, 30, mounted on a shaft, 31. It will be understood that the adjusting mechanisms for said roller and comb may be of any appropriate character for the purpose, those shown being for illustration.

The rollers 15 and 16, and the comb 18, as clearly indicated in Fig. 1, are positioned at the lower end of hopper 9, and said rollers are rotated in unison toward the fan 7 in any appropriate manner. I prefer to place below said hopper 13 a conveyer for propelling material which passes therethrough, in any desired direction, and, for the purpose, in Fig. 1 indicate an ordinary traveling carrier comprising a casing, as 35, in which is mounted a dividing board, 36, provided at its ends with sprocket, 37, 38, about which a chain, 39, is adapted to travel, said carrier being arranged to extend to the opposite side of the machine from the stacker fan, and which may terminate in a spout, 40, for delivering material into a bag, 41, or other receptacle. In this arrangement carrier chain 39 is driven by a shaft, 44, connected to its lower sprocket, 37, and having at its outer end a gear, 45, meshing with a gear, 46, mounted on a studshaft, 47, supported by the fan drum 5, or otherwise, and which includes a sprocket, 48, either independently mounted upon said stud-shaft or forming part of gear 46. A countershaft, 50, is connected to the stacker structure or thresher as may be desired, and is driven from any appropriate driving source associated with either of these elements, upon which countershaft is a sprocket, 51, communicating with said sprocket 48 by a chain, 52, by which conveyer-shaft 44 is driven. Upon said shaft 44 I mount a suitable driving element, as a sprocket or pulley, 54, which communicates with rollers 15 and 16 by a chain or belt, 55, and by which said rollers are driven so that said rollers and carrier are simultaneously operated from said countershaft 50, or otherwise.

In grain saving wind stackers now in commercial use it is common practice to employ a return auger, as 58, which is arranged parallel with fan drum 5, and which delivers material into tailings auger 60, as indicated in Fig. 3, and in applying my improved grain trap where such a delivery arrangement is provided, I operate rollers 15, 16, from a suitable gear arrangement, as 61, 62, contained in boxing, 63, for driving said auger, with which sprocket chain or belt 55 communicates and passes about the rear ends of said rollers, said gears 61, 62 being driven from countershaft 50 by a chain, 64, communicating with gear 62, as will be readily understood.

Because of the diverse designs and dimensions of the many types of threshing machines manufactured it may be desirable in some instances to employ the carrier arrangement 35 shown in Fig. 1 for delivering saved grain directly to a bag, or otherwise, while under different circumstances the employment of an auger, as 58, for conveying saved grain into the tailings auger 60 and thereby returning it to the thresher to be recleaned may be a preferable form for handling such savings, and I have therefore illustrated such modifications as practical examples of devices for the purpose, but desire it to be understood that any appropriate means for conveying such material may be employed, or dispensed with entirely, for, as is obvious, the saved material may be discharged from hopper 13 into a receptacle, or as may be desired.

In the operation of my improved stacker the straw, chaff, loose and unthreshed heads of grain, etc., discharge into the hopper 9 in a usual and well known manner, and by gravity and suction created by fan 7 such material is drawn thereinto and ejected thereby through the outlet 8 and out through the stacker pipe (not shown) as is common. However, as such material travels through the hopper and across the grain trap comprising rollers such as 15, 16, and the comb 18, the loose grains being heavier than the fluffy material sift to the bottom and become trapped in the channels 20 of comb 18, and the grooves or channels in the rollers 16, 15. As the comb 18 is slightly inclined, that grain which becomes lodged on said comb moves downwardly toward the roller 16, and as there is a space 18' between them, a considerable portion of such grain drops therethrough into hopper 13. During this operation it will be understood that rollers 16 and 15 are constantly rotating in the direction of fan 7, thus agitating the material deposited on the trap, which agitation is highly effective at this point for the reason that the suction created by fan 7 extends out into the trap, and as the material thereon is moving toward the fan by the action of the rollers there is no dead load to be picked up and withdrawn by the fan suction as is the case in the grain saving wind stacker now in use. Therefore, with said fan and rolls thus cooperating there is an intense and positive separation of light material from the grain, as the latter lies in the channels of the comb and rollers and is being shaken from the straw by the motion of the latter. Grain that has been precipitated onto roller 16 and that which passes thereto from comb 18, or a considerable portion thereof, drops through the space 18' between the rollers and into hopper 13, while that portion which is carried onto roller 15 is moved downwardly thereby through the space 15' and into hopper 13. It will thus be seen that in the trap arrangement shown there are three outlets or the precipitation of saved grain into hopper 13, and that if more than two rollers are employed there will be a corresponding increase in the number of such spaces.

It will also be understood that I provide a large number of channels within which to capture or trap the grain which would otherwise pass into the fan with the other material and become wasted in the straw stack; and, further, that by the constantly rotating rollers grain falling in the channels thereof is quickly diverted downwardly through the spaces provided and away from the influence of the suction from stacker fan 7, so that such suction acts upon the straw, chaff, etc., to withdraw the same from the hopper, while the loose grains by the movable action of the rollers discharge through the trap and into hopper 13 from which it is conveyed away by carrier 35 or auger 58, or in any other desired manner as hereinbefore explained. In the practical operation of my improved trap I have demonstrated that I have eliminated the objection heretofore stated, that is, the overloading of the trap with chaff and fine particles, as the movement of the grooved rollers accelerates the chaff and fine material in its travel toward the fan, and being of an extremely light and fluffy character is readily withdrawn by the suction of said fan, so that I accomplish a high degree of separation, and am enabled to save the grain in comparatively clean condition which would otherwise be wasted in the straw stack.

As a wind stacker is part of the regular equipment of threshers, clover hullers, corn shredders, and the like, and as there is considerable variation in the size and character of the material which these different machines handle, I prefer to install my improved trap in adjustable form so that there may be greater or less spaces between its separating elements. In other words, where clover, timothy, or such finer seeds or grains are being threshed, the spaces between the separators may be diminished, while for wheat and oats these spaces should be slightly larger, and for shredding corn stalks the spaces obviously should be much greater to permit the kernels of corn to pass therethrough. Therefore, as indicated, any preferred form of mechanisms may be employed for making such adjustments, those particularly detailed in Fig. 8 being of a comparatively simple character, but such specific devices I do not desire to be understood as limiting myself to, as any expedient mechanisms for the purpose may be employed.

I claim as my invention:

1. In a pneumatic stacker, the combination, with a fan, of a material receiving and conveying hopper, a grain trap interposed between said fan and hopper comprising a plurality of rollers spaced apart to permit the passage of grain therebetween, and means for rotating said rollers to propel material toward said fan.

2. In a pneumatic stacker, the combination, with a fan, of a material receiving and conveying hopper, a grain trap interposed between said fan and hopper comprising a plurality of grooved rollers, and means for rotating said rollers in the direction of said fan.

3. In a pneumatic stacker, a grain trap comprising a plurality of grooved rollers adapted to separate grain from other material, means in advance of said rollers for separating grain, a fan, and means for actuating said rollers to propel material into said fan.

4. The combination, in a pneumatic stacker, of a fan, a hopper, a plurality of rollers interposed between said fan and hopper for separating grain from other material, means for rotating said rollers toward said fan for carrying material thereto, and a conveyer beneath said rollers for delivering material discharging therefrom.

5. The combination, in a pneumatic stacker, of a fan, a hopper, a grain trap comprising rollers interposed between said fan and hopper, a conveyer beneath said rollers, means for actuating said conveyer, and means communicating with said conveyer and rollers for rotating the latter.

6. The combination, in a pneumatic stacker, of a fan, a hopper, a grain trap comprising rollers, means for adjusting said rollers in relation to each other to increase or decrease the space therebetween for separating grains of varying sizes, and means for actuating said rollers to propel material and separate grain therefrom.

7. In a grain trap for pneumatic stackers, a plurality of rotary separators, a comb or plate cooperating therewith to separate grain from other material, and means for adjusting such plate in relation to said rollers.

8. In a pneumatic stacker, a fan, a plurality of grooved rotary separators adapted to rotate in the direction of said fan, said separators being spaced to permit the discharge of grain therebetween, driving mechanism, and means communicating with said driving mechanism and said separators for operating the latter.

9. The combination, in a pneumatic stacker, of a fan, a hopper, a grain trap comprising rollers interposed between said fan and hopper, a conveyer beneath said trap, a driving shaft for said conveyer, means for driving said shaft, and means communicating with said shaft and said rollers for rotating the same to propel material toward said fan and separate grain therefrom.

10. The combination, in a pneumatic stacker, of a fan, a material receiving and delivering hopper for conveying material thereinto, a grain trap interposed between said trap and hopper over which material travels from said hopper to said fan, said trap comprising a plurality of rollers, and means for rotating said rollers in the direction of said fan to accelerate the movement of material thereinto and separate grain from such material.

11. The combination, in a pneumatic stacker, of a fan, supporting means secured to said fan, a plurality of rotary separators mounted in said supporting means for separating grain from other material, and means beneath said separators for directing material therefrom.

12. In a pneumatic stacker, a material receiving and conveying hopper, a grain trap at the lower end thereof comprising a plurality of rollers, a fan adjacent said rollers, means for rotating said rollers toward said fan, means for adjusting one of said rollers in relation to the other, and a hopper beneath said rollers for directing material therefrom.

13. In a pneumatic stacker, a grain trap comprising rollers arranged in parallel and spaced relation, and means for actuating the same.

14. In a pneumatic stacker, a fan, a grain trap comprising grooved rolls arranged in parallel and spaced relation, and means for actuating said rolls to rotate in the direction of said fan.

15. In a pneumatic stacker, a fan, a roll spaced therefrom and rotating in the direction thereof, a roll spaced from said first-mentioned roll and rotating in the direction of said roll, and means for simultaneously rotating said rolls in the direction of said fan.

16. In combination with a threshing machine, a wind stacker comprising a suction fan and a chute for propelling material received from said thresher, and means comprising a plurality of rollers interposed between said thresher and said wind stacker fan for intercepting material discharging from said thresher into said stacker and separating and saving grain therefrom.

In testimony whereof I affix my signature.

FRANK B. CARTER.